Figure 1:
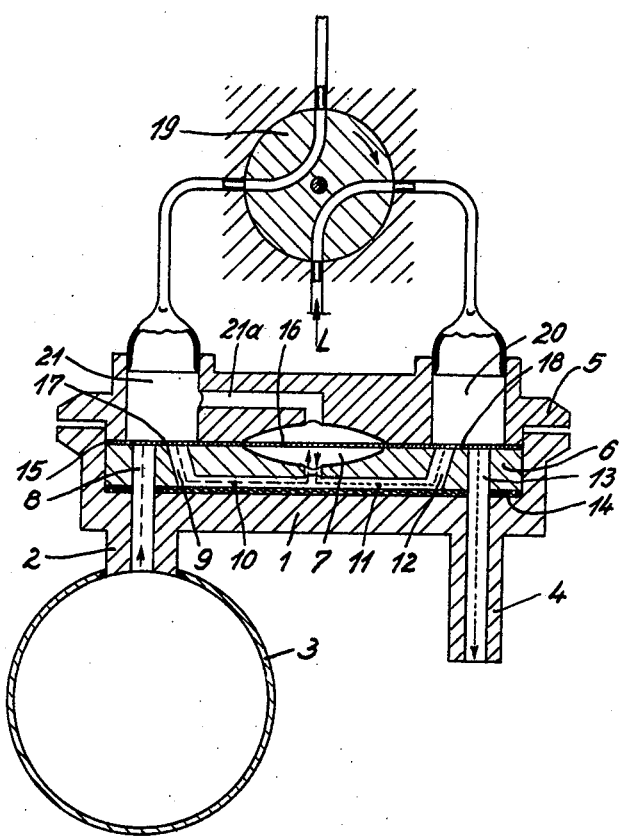

Oct. 15, 1963   J. SONNBERG   3,106,844
DEVICE FOR AUTOMATICALLY DRAWING SAMPLES FROM A FLOWING MEDIUM
Filed Feb. 23, 1961   3 Sheets-Sheet 3

Inventor.
Joachim Sonnberg.

United States Patent Office 3,106,844
Patented Oct. 15, 1963

3,106,844
DEVICE FOR AUTOMATICALLY DRAWING SAMPLES FROM A FLOWING MEDIUM
Joachim Sonnberg, Hildesheim, Germany, assignor to Diessel Molkereimaschinen-Fabrik G.m.b.H., Hildesheim, Germany, a company of Germany
Filed Feb. 23, 1961, Ser. No. 91,176
Claims priority, application Germany July 25, 1960
6 Claims. (Cl. 73—422)

This invention is concerned with a device for automatically drawing proportional samples from a medium flowing under pressure.

Various automatically operating sampling devices are known which are respectively adapted to draw proportional amounts from a liquid flowing through a volume meter. In one of these devices, there is provided a sample measuring chamber which alternately receives a defined amount of liquid and expels it over a discharge line into a sample vessel. The filling and emptying of the sample measuring chamber is thereby effected by the use of devices operating in the manner of piston controlled pumps which are driven or controlled by the volume meter. For the control of the piston operation, there are used, for example, measuring cocks and control slides which are driven by the volume meter. A considerable disadvantage of such an arrangement is that the measuring accuracy of the volume meter is decreased because it has to supply the driving power for the control devices.

In another known arrangement, the measuring chamber is filled with the action of the pressure exerted by the medium which is being processed and is emptied again by the pressure exerted by an auxiliary force on a partition wall disposed in the measuring chamber, whereby the auxiliary force, which is at a pressure exceeding that of the medium, is periodically released under control of the volume meter. The volume meter is accordingly not loaded mechanically; it merely causes actuation of a known electrical, pneumatic or hydraulic impulse transmitter for releasing the auxiliary force, the impulse transmitter producing practically no reaction that would affect the volume meter. The partition wall is in this known arrangement a membrane which is movably disposed in the measuring chamber, weight or spring biased valves being utilized which are adapted to open in the direction of the flow of the liquid for the alternate control of the inlet and outlet openings of the sample measuring chamber.

In order to avoid such valves, the arrangement according to the invention provides membrane means for controlling the manner of valves the inlet and discharge openings of the sample measuring chamber, such membrane means operating in part in the manner of a movable partition which is effected by the pressure of the flowing medium, to free the inlet opening for the filling of the sample measuring chamber, and being alternately operative by the action of the pressure exerted thereon by an auxiliary force, to free the discharge opening.

The arrangement according to the invention permits, aside from the elimination of sensitive valves, quick and easy dismantling of the parts, which is particularly desirable, for example, in the measuring of milk, which requires for sanitary reasons thorough cleaning in relatively short intervals. To achieve further simplification, the movable partition wall and the valve-like closure members may be part of one and the same membrane.

The apparatus according to the invention provides channels of conduits for the guidance of the flowing medium between the draw-off part and the sample measuring chamber and between the latter and the discharge part, which are formed in the manner of bores and grooves in an intermediate plate which also accommodates the sample measuring chamber.

The use and construction of such intermediate plate, which contains the channels through which the material flows, facilitates the assembly and removal thereof and therewith the cleaning of the corresponding channels and grooves.

Figure 2:
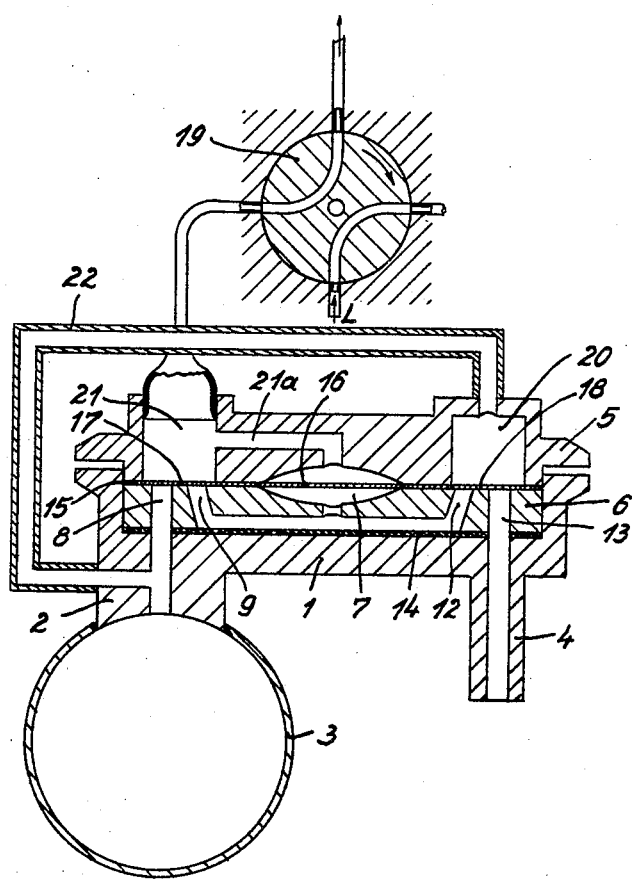
Figure 3:
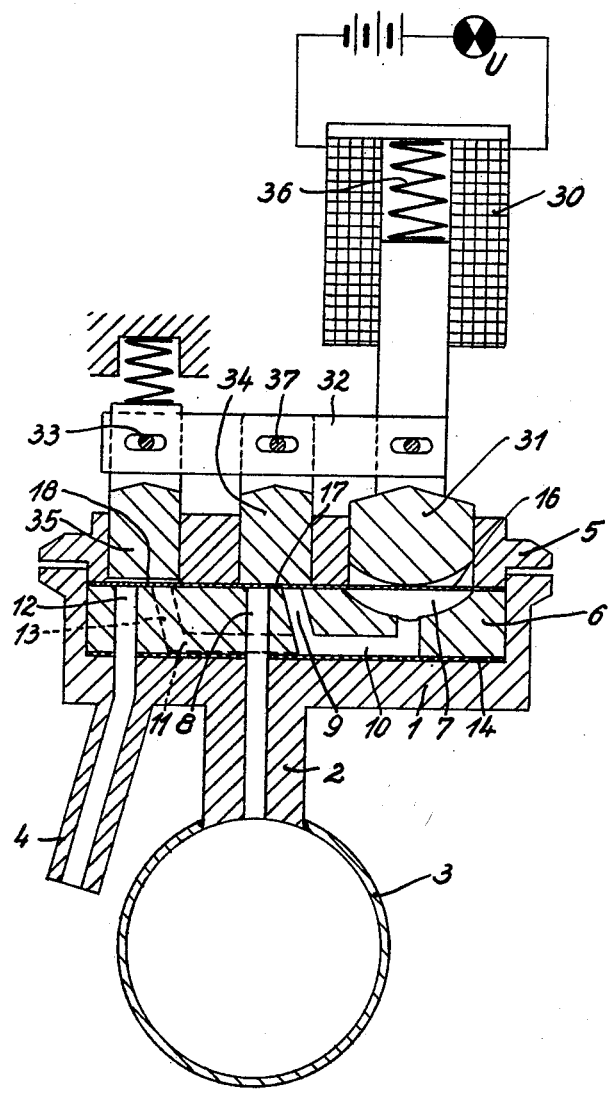

The foregoing and further objects and features will appear from the description which is rendered below with reference to the accompanying drawings, FIGS. 1, 2 and 3, showing in schematic representation three embodiments with details included therein only to the extent required for an understanding of the invention.

Referring now to FIG. 1, numeral 1 indicates a structural part provided with a connection 2 for drawing off samples of the medium to be measured, which is contained in the receptacle 3, and further provided with a connection 4 for the discharge of the sample. Between the structural part 1 and another structural part 5 is disposed the intermediate plate 6. The structural part 5 is provided with conduits for the passage of compressed air L which serves as the auxiliary force. Numeral 7 indicates the sample measuring chamber, numerals 8 and 9 bores, numerals 10 and 11 grooves, and numerals 12 and 13 further bores, all formed in the intermediate plate 6. These bores and grooves serve in the taking of samples for directing the flow of the medium which is to be processed from the inlet 2 to the sample measuring chamber 7 (dash lines) and between the latter and the discharge 4 (dotted lines); the grooves 10 and 11 are thereby in part defined by the sealing gasket 14 disposed between the structural part 1 and the intermediate plate 6. Between the part 5 and the intermediate plate 6 is disposed the membrane 15, the portion 16 of such membrane forming the movable partition wall of the measuring chamber 7, and the portions 17 and 18 forming respectively closures for the inlet ports or openings at the bores 8, 9 and the discharge ports or openings at the bores 12, 13. The grooves 10, 11 may also be formed in the structural part 1 and, in such case, they would be in part defined by a sealing gasket such as 14 cooperating with the intermediate plate 6.

The control member 19 is, in the operation of the device, displaced under control of the volume meter (not shown) so as to de-aerate the channel 21, thereby causing the membrane portion 17 to be raised by the pressure exerted thereon by the medium to be measured and thus freeing the inlet ports of the bores 8, 9 to effect flow of the medium into the sample measuring chamber 7. Emptying of the sample measuring chamber 7 is for the time being prevented by the pressure of compressed air which is conducted from the air inlet L through the channel 20, thereby exerting downward pressure on the membrane part 18 which seals the discharge ports formed by the bores 12, 13. Upon rotating, the control member 19, during the further rotation of the volume meter, by 90° from the illustrated position, compressed air will be conducted into the channel 21 to act upon the membrane portion 17 so as to close the inlet ports, thus stopping further flow of liquid into the measuring chamber 7, and will also be conducted through the conduit 21a to act upon the movable portion 16 of the membrane, which operates as a partition wall. The membrane portion 16 is accordingly moved downwardly, exerting pressure upon the liquid sample contained in the measuring chamber, to expel the sample along the discharge bores or conduits 12, 13, the ports of such discharge bores being now freed by the cessation of pressure acting upon the membrane portion 18.

It will be seen from the foregoing description that the sample to be taken flows through bores and grooves or conduits which are substantially formed in the intermediate plate 6. Such conduits are accordingly readily accessible for cleaning after removal of the intermediate plate which is as easily effected as its subsequent replacement.

FIG. 2 shows another embodiment of the device according to the invention. The connection of the control member 19 with the channel 20, as shown in FIG. 1, is eliminated in this embodiment, the channel 20 being interconnected with the take off member 2 by means of a hose 22. The compressed air operates in this case as an auxiliary force which is periodically released under the control of the volume meter, thus acting periodically on the membrane portion 17. This membrane portion is, in the position of the control member 19 as shown in FIG. 2, released of pressure so as to allow filling of the measuring chamber 7 by the opening of the inlet ports formed by the bores or conduits 8, 9, the operation being similar to the one described in connection with FIG. 1. The membrane portion 18 is during this filling operation held in sealing engagement with the ports formed by the discharge bores or conduits 12, 13, by the pressure of the medium which is being processed, part of such medium being conducted to the membrane portion 18 through the hose 22. For the emptying of the sample measuring chamber 7, the compressed air is caused to act on the membrane portions 16 and 17, through the conduits 21, 21a, as in FIG. 1, the membrane portion 18 being thereby released of pressure to free the discharge conduits 12, 13, and the sample is in this manner again discharged by the pressure of the auxiliary force as in the first described embodiment.

In the embodiment according to FIG. 3, the auxiliary force is applied in the form of electrical impulses released by the action of the volume meter. There is provided an interrupter U which is in suitable manner controlled by the rotation of the volume meter (not shown), such interrupter effecting periodic closure of a circuit for the magnet 30, the latter being upon energization effective to lift the pressure member 31 from the membrane portion 16. The lever 32 rotates thereby counterclockwise about the pivot pin 33 and, accordingly, effecting lifting of the pressure member 34 from the membrane portion 17, thus freeing the inlets at the conduits 8, 9 and allowing an amount of liquid to flow along the groove or conduit 10 into the measuring chamber 7. Pressure is by means of the pressure member 35 coincidently exerted on the membrane portion 18 which closes the discharge ports formed by the conduits 12, 13. Upon opening of the circuit by the interrupter U, a spring 36 will press the pressure member 31 against the membrane portion 16, and pressure will also be exerted by the lever 32 on the member 34, such pressure acting on the membrane portion 17 to seal the inlet ports formed by the conduits 8 and 9. The lever 32 pivots thereby about the pin 37, rotating clockwise and lifting the pressure members 35 to relieve the pressure on the membrane portion 35, thus freeing the discharge ports of the conduits 12, 13 and allowing outflow of the liquid medium from the sample measuring chamber 7 through the groove or conduit 11.

Changes may be made within the scope and spirit of the appended claims which define what is believed to be new and desired to have protected by Letters Patent.

I claim:
1. A device for automatically drawing proportional samples from a medium flowing under pressure, comprising two readily separable structural housing parts, an intermediate plate disposed between said parts, a membrane disposed between said intermediate plate and one of said housing parts, said intermediate plate being cooperable with said membrane to define a sample chamber, one of said housing parts being provided with means forming a withdrawal connection for a receptacle containing the medium to be metred and also forming a delivery connection for the sample obtained, said intermediate plate having passages therein communicating with said chamber and disposed for communication with said connections, said membrane being operatively related to said passageways to selectively operatively close the respective passageways and thus control the flow to and from said chamber, said other housing part having openings formed therein, means cooperable with said openings for selectively conducting to said membrane an auxiliary force which has an operative pressure exceeding that of said medium, operative upon said membrane to effect closure of the passageway to said chamber and exert pressure upon the medium therein for effecting discharge therefrom to said delivery connection, said other housing part having another opening formed therein for conducting to said membrane a force operative to effect closure of the passageway to said delivery connection during filling of said chamber, said membrane being selectively movable under the action of pressure from said medium to periodically open the respective passageways to permit flow of the medium to said chamber and therefrom to said delivery connection.

2. A device according to claim 1, wherein said passageways are formed at least in part by grooves extending longitudinally in the intermediate plates, said grooves being covered by the housing part provided with the withdrawal connection and the discharge connection.

3. A device according to claim 1, wherein said passageways are formed in part by grooves extending longitudinally of the intermediate plate, said grooves being covered by said housing part provided with the withdrawal connection and the discharge connection, said intermediate plate having bores therein operatively communicating with the respective grooves for connecting the latter with the respective connections.

4. A device according to claim 1, wherein the closure of the discharge opening of the sample chamber is upon the filling thereof effected by the pressure exerted by said auxiliary force.

5. A device according to claim 1, wherein the closure of the discharge opening of the sample chamber is upon the filling thereof effected by the pressure exerted by the medium to be metered.

6. A device according to claim 1, comprising pressure members operative to produce forces for controlling the operation of the membrane, and lever means associated with said pressure members for moving the latter.

References Cited in the file of this patent
UNITED STATES PATENTS 2,223,785    Hassler    Dec. 3, 1940
2,764,017    Ronnebeck    Sept. 25, 1956

OTHER REFERENCES

Publication: Gas Chromatography, edited by D. H. Desty, Butterworths Scientific Publications, London, 1958, pp. 289–293 relied on.